(12) United States Patent
Fisher et al.

(10) Patent No.: US 7,448,662 B1
(45) Date of Patent: Nov. 11, 2008

(54) REVERSIBLE CARGO HOLD SKIRT

(75) Inventors: Glenn David Fisher, Midwest City, OK (US); Douglas Bradley Fisher, Montgomery, AL (US)

(73) Assignee: Ahead of the Curve Innovations, LLC

( * ) Notice: Subject to any disclaimer, the term of this patent is extended or adjusted under 35 U.S.C. 154(b) by 301 days.

(21) Appl. No.: 11/481,274

(22) Filed: Jul. 5, 2006

(51) Int. Cl.
*B60R 13/01* (2006.01)
(52) U.S. Cl. ..................................... 296/39.1
(58) Field of Classification Search ............... 296/39.1, 296/97.23, 136.1, 136.13; 220/495.01
See application file for complete search history.

(56) References Cited

U.S. PATENT DOCUMENTS

| | | | |
|---|---|---|---|
| 2,911,253 A | * | 11/1959 | Dewey ..................... 296/39.1 |
| 5,129,678 A | | 7/1992 | Gurbacki |
| D354,937 S | | 1/1995 | Nentwich |
| D367,033 S | | 2/1996 | Phirippidis |
| 5,868,425 A | | 2/1999 | McNulty |
| 6,663,156 B1 | * | 12/2003 | Kincaid et al. ............. 296/39.1 |
| 6,880,879 B2 | | 4/2005 | Pickard |
| 2003/0038497 A1 | * | 2/2003 | Fitzgerald ................. 296/39.1 |
| 2003/0226627 A1 | | 12/2003 | Clark |

* cited by examiner

*Primary Examiner*—Lori L Lyjak
(74) *Attorney, Agent, or Firm*—McCarthy Law Group

(57) ABSTRACT

An apparatus and associated method for a cargo hold skirt is provided with a plurality of fasteners configured for attaching one end thereof to a cargo hold of an automobile for draping the cargo hold skirt from the attached end over an exterior surface of the automobile. The cargo hold skirt has first and second layers that are edgewise connected along at least one edge to keep the layers together and that are edgewise disconnected along at least one edge in order to make exposed surfaces of the layers reversible.

20 Claims, 3 Drawing Sheets

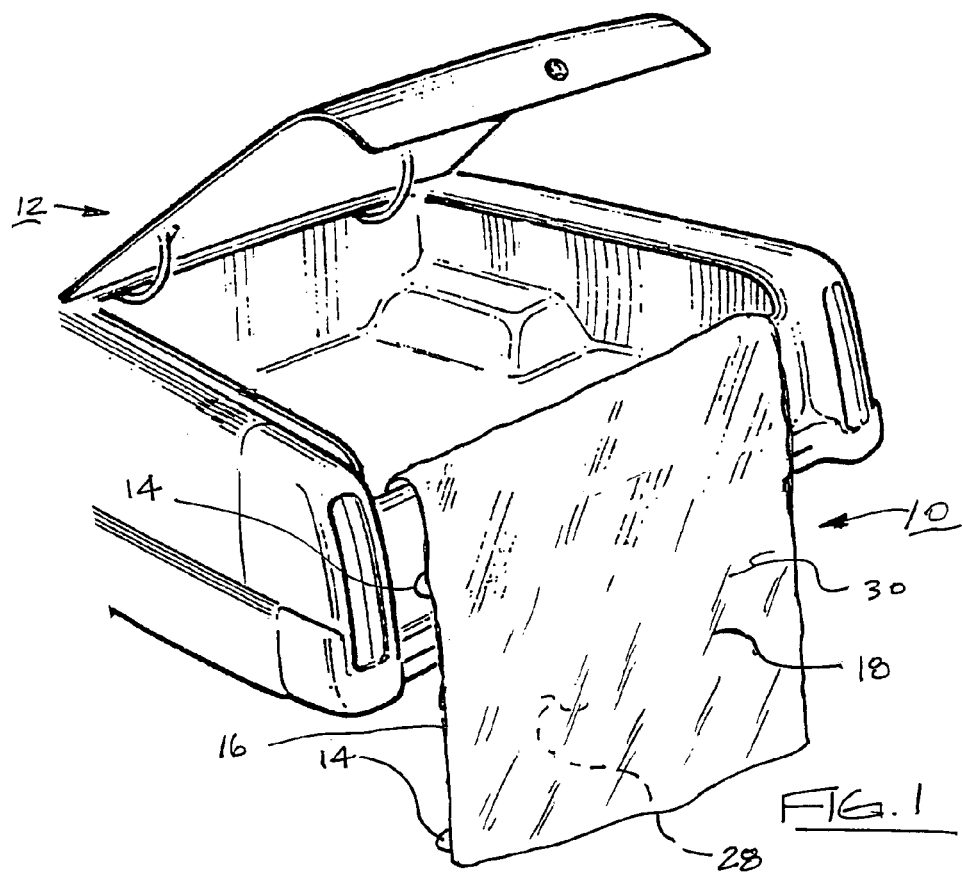
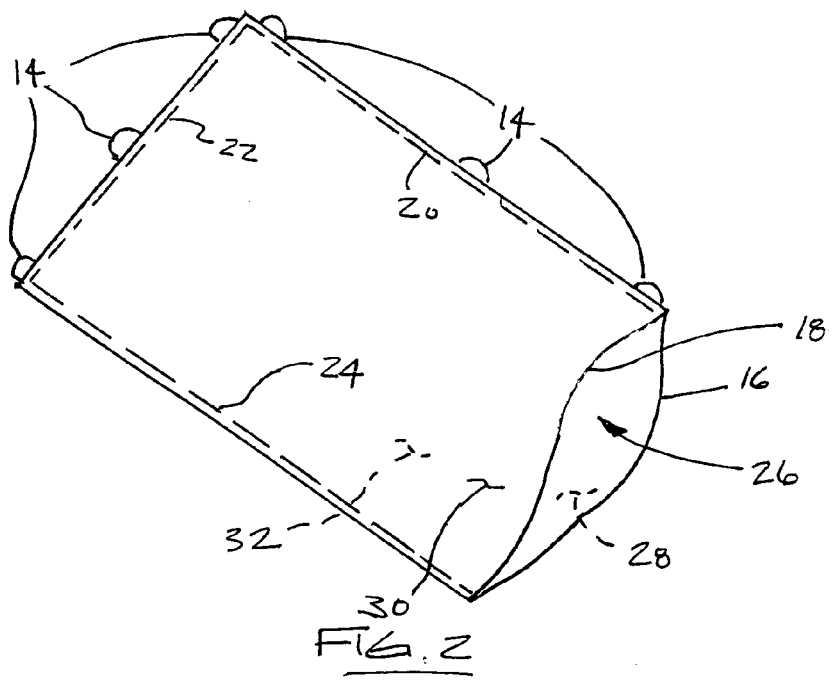

REVERSIBLE CARGO HOLD SKIRT

FIELD OF THE INVENTION

The claimed invention relates generally to the field of automobile usage and travel accessories and more particularly, but not by way of limitation, to an apparatus and method for providing a protective covering device for the cargo hold area of an automobile with other utility as well.

BACKGROUND

In the normal course of use an automobile routinely gets dirty. Placing articles into or retrieving articles from the cargo hold area of the automobile often subjects a person to leaning against or even brushing up against the dirty exterior. For this reason the person will use, if available, a protective covering device draped over the automobile to keep her clothes clean. Such a protective device is useful as well to protect the automobile finish when articles are slid into the cargo hold.

Besides this need for a protective covering device, other utilitarian automobile accessories are stored away in the cargo hold, such as containerization devices and emergency warning devices. When provided individually all these devices can clutter the cargo hold. There is therefore a continued need for improvements in the art for providing all the necessary accessories in a compact size so as to not adversely reduce the available cargo hold volume. It is to these improvements that the embodiments of the invention are directed.

SUMMARY OF THE INVENTION

Embodiments of the present invention are generally directed to an apparatus and associated method for selectively employing an automobile accessory for different purposes.

In some embodiments a cargo hold skirt is provided with a plurality of fasteners configured for attaching one end thereof to a cargo hold of an automobile for draping the cargo hold skirt from the attached end over an exterior surface of the automobile. The cargo hold skirt has first and second layers that are edgewise connected along at least one edge to keep the layers together, and that are edgewise disconnected along at least one edge in order to make exposed surfaces of the layers reversible.

In some embodiments a method includes providing a cargo hold skirt having first and second layers that are edgewise connected along at least one edge to keep the layers together, and that are edgewise disconnected along at least one edge in order to make the layers reversible. The method also includes attaching an end of the cargo hold skirt to a cargo hold of an automobile, thereby draping the cargo hold skirt from the attached end over an exterior surface of the automobile.

In some embodiments an automobile accessory is provided having a cargo hold skirt and means for selectively switching the cargo hold skirt from a protective covering device to an emergency messaging device.

These and various other features and advantages which characterize the claimed invention will become apparent upon reading the following detailed description and upon reviewing the associated drawings.

BRIEF DESCRIPTION OF THE DRAWINGS

FIG. 1 is an isometric depiction of a cargo hold skirt constructed and attached to the cargo hold of an automobile in accordance with embodiments of the present invention.

FIG. 2 is an isometric depiction of the cargo hold skirt of FIG. 1.

DETAILED DESCRIPTION

Figure 3:
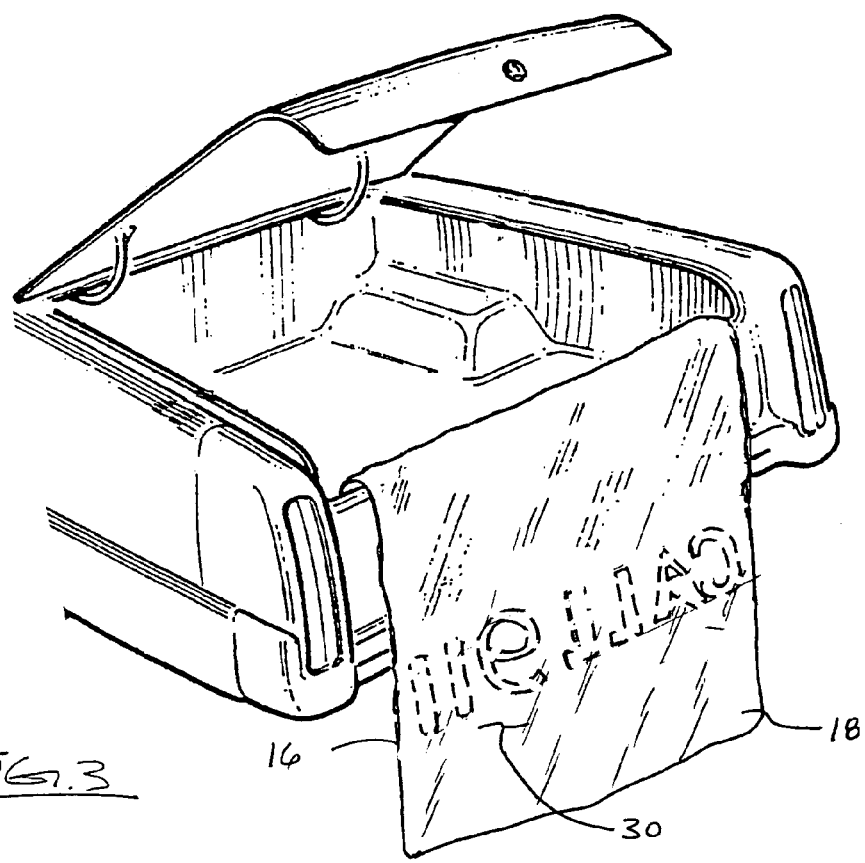
FIG. 3 is a view similar to FIG. 1 of a cargo hold skirt used as a protective covering device but with separate utility as an emergency messaging device.

FIG. 1 shows a cargo hold skirt 10 attached at one end thereof to the cargo hold of an automobile 12. In this case the cargo hold is the trunk space of the automobile, shown by the lifted trunk lid. In alternative equivalent usages the cargo hold of the automobile can be differently configured, such as but not limited to the bed of a pickup truck or the rear bay of a sport utility vehicle. For use in any of these cargo holds it is advantageous to make the cargo hold skirt from a rectangularly shaped sheet about three feet long by four feet wide.

Preferably the cargo hold skirt 10 has a plurality of fasteners 14 for removably attaching one end to the cargo hold, so as to drape the cargo hold skirt 10 from the attached end over the exterior surface of the automobile. In the illustrative embodiments of FIG. 1 the fasteners 14 are loops that are connectable to corresponding hooks (not shown) attached in the cargo hold. In alternative equivalent embodiments other types of fasteners can be employed as desired, such as but not limited to snaps, threadingly engaging members, and hook-and-pile engaging members.

FIG. 2 is an isometric view of the cargo hold skirt 10 of FIG. 1 showing that preferably a number of the fasteners 14 are provided along at least one each of the length and width of the sheet. The cargo hold skirt 10 of the present embodiments has at least two layers 16, 18 that are edgewise connected along at least one edge to keep the layers 16, 18 together. In the illustrative embodiments of FIG. 2 the layers 16, 18 are edgewise connected along edges 20, 22, 24. The edgewise connection can be provided such as by stitching the layers 16, 18 together. In alternative equivalent embodiments other types of connections can be used such as but not limited to adhering, fusing, and the like.

The layers 16, 18 are also edgewise disconnected along at least one edge. In the illustrative embodiments of FIG. 2 the three connected edges and one disconnected edge forms a pocket 26. The pocket 26 is useful for employing the cargo hold skirt 10 as a containerization device. For example, a dirty flat tire can be stored away inside the pocket 26 to keep the cargo hold clean. In other usages the cargo hold skirt 10 can be used to transport articles being loaded into or unloaded from the cargo hold. The pocket 26 construction is also useful for reversing the layers 16, 18, as described further below.

The layered construction allows the advantageous use of different materials for each layer. For example, preferably the layer 16 has a surface 28 that contactingly engages the automobile exterior surface with a relatively high coefficient of friction for grippingly engaging the exterior surface. This prevents the cargo hold skirt 10 from sliding on the exterior surface as an article is slid on the cargo hold skirt 10. Clearly, the desired non-skid engagement must be non-marking as well so as to not damage the exterior surface of the automobile. It has been determined by experimentation that a woven cloth material, such as but not limited to a low-pile fleece material, is well suited for construction of the layer 16 that contactingly engages the automobile when the cargo hold skirt 10 is employed as a protective covering device.

Contrarily, the layer 18 that may come into contact with a user and/or an article placed into the cargo hold preferably has a smooth sealed surface with a relatively low coefficient of friction. The smooth sealed surface makes it easier to keep it clean, and the low friction aids in sliding articles on the cargo hold skirt 10 into the cargo hold. It has been determined by experimentation that a polymeric material, such as but not limited to a nylon material, is well suited for construction of the layer 18 that contactingly engages the user and/or the article when the cargo hold skirt 10 is employed as a protective covering device.

Figure 4:
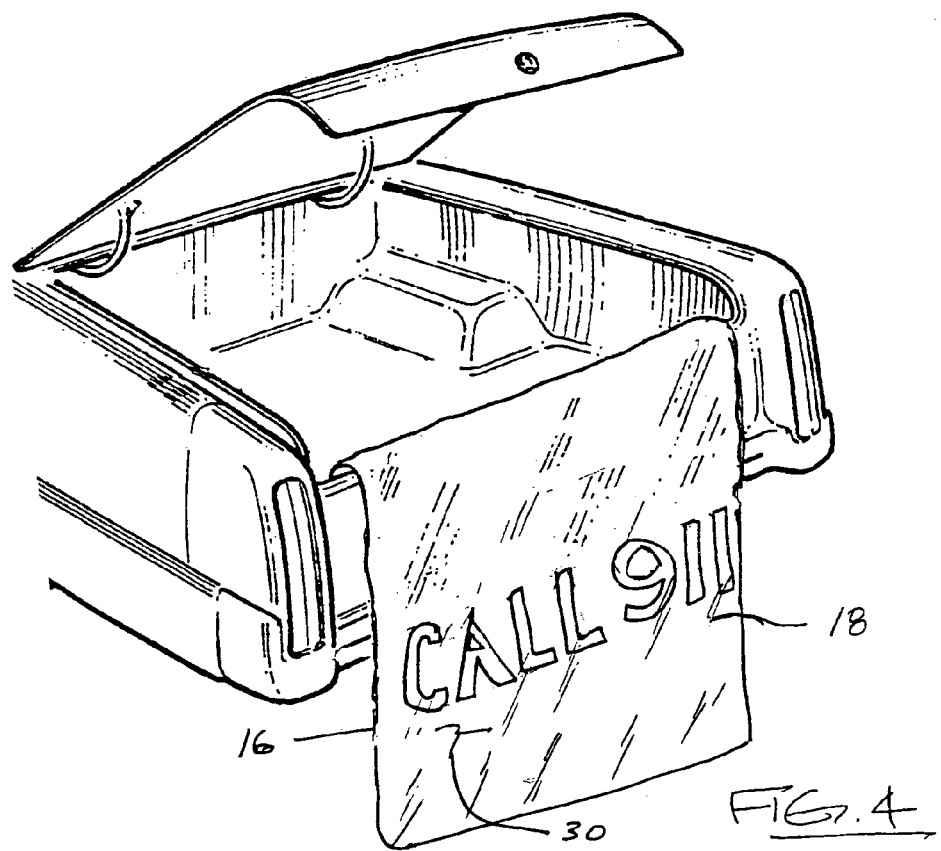
FIG. 4 is a view of the cargo hold skirt of FIG. 3 alternatively used as an emergency messaging device.

In this usage as a protective covering device the cargo hold skirt 10 can be made of non-descript layers for not drawing attention to them, or alternatively they can be provided with decorative and/or endorsement designs such as team logos. The reverse side of one or more layers, however, can be provided with reflective surfaces and/or appropriate indicia for use as an emergency messaging device. FIGS. 3 and 4, for example, depict embodiments wherein an emergency message "CALL 911" is printed on the surface 32 (see FIG. 4) of the layer 18. Thus, when using the cargo hold skirt 10 as a protective covering device in FIG. 3 the emergency message is not visible. However, by reversing the layers 16, 18 the emergency message becomes clearly visible as an indication that help is needed. The user can thus post the emergency message and return to the safety of a locked automobile until help arrives. In other cases other types of messages can be provided, such as "HELP IS ON THE WAY" on the other end of the surface 32 to discourage passers by from becoming involved if the user has otherwise obtained help such as by making a cell phone call.

Figure 5:
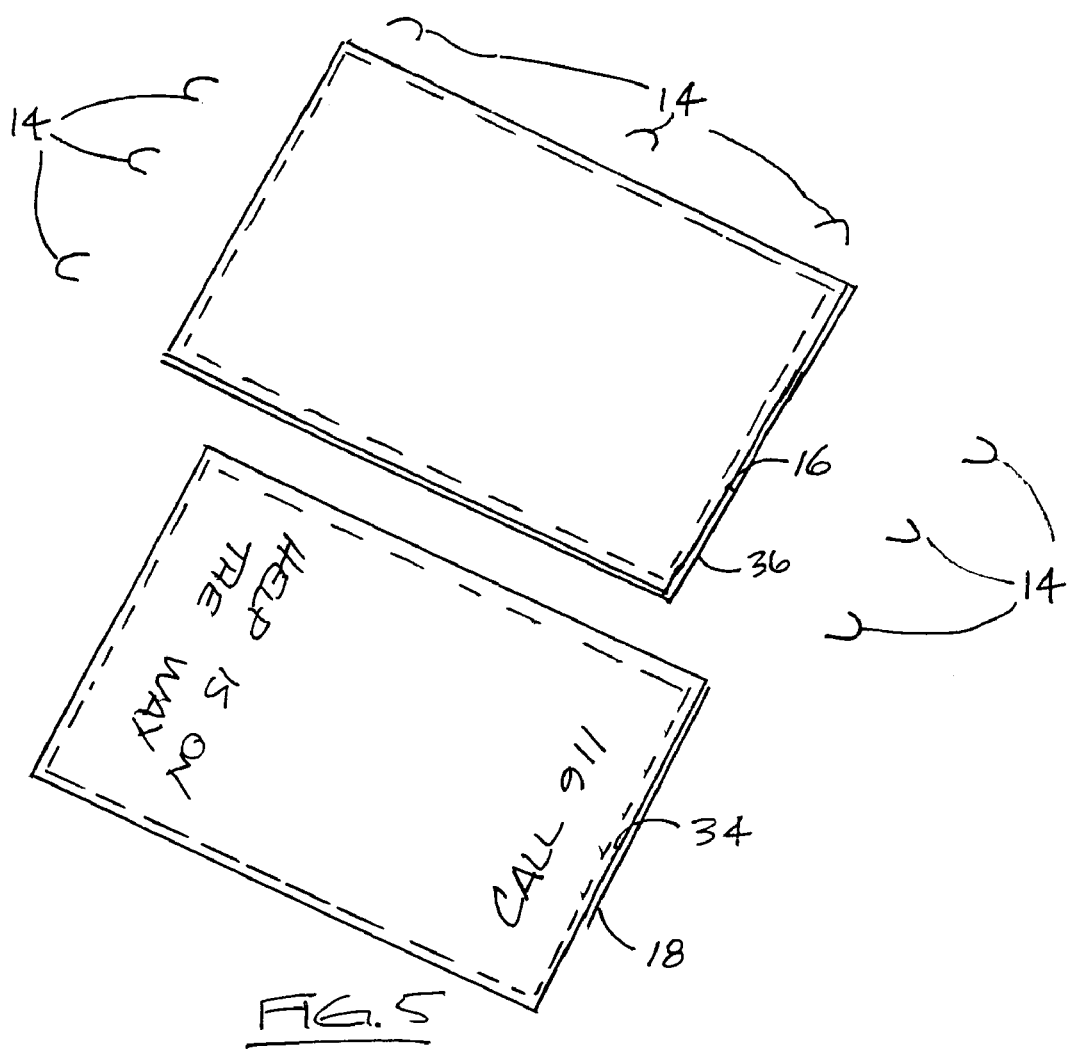
FIG. 5 is an exploded isometric depiction of a cargo hold skirt constructed in accordance with embodiments of the present invention.

In the embodiments discussed so far, the surface 30 of layer 18 is nondescript while the surface 32 is made for getting attention, such as by being safety-orange colored and/or provided with reflective markings. FIG. 5 shows how in some embodiments this difference in surface treatments is more feasibly provided by attaching another layer 34 of different material to the layer 18. Preferably these two layers 18, 34 are edgewise connected along all the edges as depicted. Similarly, another layer 36 can be likewise connected to the layer 16 for providing a waterproof liner for the woven-cloth layer 16. The two-ply layers 16, 36 and 18, 34 are joined together as in FIG. 2 to form the pocket 26. In FIG. 5 it will also be noted that fasteners 14 are preferably connected at both ends along one dimension so that each of two different emergency messages can be displayed.

Summarizing, in some embodiments a cargo hold skirt (such as 10) is provided having a plurality of fasteners (such as 14) configured for attaching one end thereof to a cargo hold of an automobile (such as 12) for draping the cargo hold skirt from the attached end over an exterior surface of the automobile. The cargo hold skirt has first and second layers (such as 16, 18) that are edgewise connected along at least one edge (such as 20, 22, 24) to keep the layers together. The layers are edgewise disconnected along at least one edge in order to make exposed surfaces of the layers reversible.

The first layer preferably has a relatively high coefficient of friction, such as but not limited to low-pile fleece material, for grippingly engaging the outer surface of the automobile. The opposing second layer preferably has a relatively low coefficient of friction, such as but not limited to nylon material, for slidingly supporting an article placed in the automobile cargo hold.

A third layer (such as 34) can be attached to line the first layer, and a fourth layer (such as 36) can likewise be attached to line the second layer. Preferably, these liner layers are edgewise connected along all edges. The liner layers can advantageously provide a waterproof lining, and/or can be adorned with reflective treatments and emergency messages.

In other embodiments a method is provided with steps of providing a cargo hold skirt having first and second layers that are edgewise connected along at least one edge to keep the layers together, and that are edgewise disconnected along at least one edge in order to make the layers reversible; and attaching an end of the cargo hold skirt to a cargo hold of an automobile, thereby draping the cargo hold skirt from the attached end over an exterior surface of the automobile.

Depending on the desired usage as either a protective covering device or as an emergency messaging device, the method can further include a step, prior to the attaching step, of reversing the layers. The method can also include a step of placing an article, such as a dirty flat tire, into a pocket formed by the layers.

In other embodiments an automobile accessory is provided having a cargo hold skirt, and means for selectively switching the cargo hold skirt from a protective covering device to an emergency messaging device. For purposes of this description and meaning of the attached claims, the term "means for selectively switching" require the structure disclosed herein permitting reversing of the layers in order to either hide or display the reflective and/or indicia associated with the desired message.

It is to be understood that even though numerous characteristics and advantages of various embodiments of the present invention have been set forth in the foregoing description, together with details of the structure and function of various embodiments of the invention, this detailed description is illustrative only, and changes may be made in detail, especially in matters of structure and arrangements of parts within the principles of the present invention to the full extent indicated by the broad general meaning of the terms in which the appended claims are expressed. For example, the particular elements may vary depending on the particular processing environment without departing from the spirit and scope of the present invention.

In addition, although the embodiments described herein are directed to a cargo hold skirt, it will be appreciated by those skilled in the art that the claimed subject matter is not so limited and various other devices can embody the embodiments of the present invention without departing from the spirit and scope of the claimed invention.

What is claimed is:

1. A cargo hold skirt comprising a plurality of fasteners configured for attaching one end thereof to a cargo hold of an automobile for draping the cargo hold skirt from the attached end over an exterior surface of the automobile, the cargo hold skirt further comprising first and second layers that are edgewise connected along at least one edge to keep the layers together and that are edgewise disconnected along at least one edge in order to make exposed surfaces of the layers reversible.

2. The cargo hold skirt of claim 1 wherein the first layer comprises a relatively high coefficient of friction for grippingly engaging the outer surface of the automobile.

3. The cargo hold skirt of claim 2 wherein the second layer comprises a relatively low coefficient of friction for slidingly supporting an article placed in the automobile cargo hold.

4. The cargo hold skirt of claim 2 wherein the first layer comprises a woven cloth material.

5. The cargo hold skirt of claim 4 wherein the first layer comprises a low-pile fleece material.

6. The cargo hold skirt of claim 3 wherein the second layer comprises a polymeric material.

7. The cargo hold skirt of claim 6 wherein the second layer comprises a nylon material.

8. The cargo hold skirt of claim 2 further comprising a third layer attached to the first layer.

9. The cargo hold skirt of claim 8 wherein the first and third layers are edgewise connected along all edges.

10. The cargo hold skirt of claim 8 wherein the third layer comprises a waterproof material.

11. The cargo hold skirt of claim 8 wherein at least one of the second and third layers comprises a reflective surface.

12. The cargo hold skirt of claim 2 further comprising a fourth layer attached to the second layer.

13. The cargo hold skirt of claim 12 wherein the second and fourth layers are edgewise connected along all edges.

14. The cargo hold skirt of claim 12 wherein at least one of the third and fourth layers comprises a reflective surface.

15. A method comprising:
providing a cargo hold skirt having first and second layers that are edgewise connected along at least one edge to keep the layers together and that are edgewise disconnected along at least one edge in order to make the layers reversible; and
attaching an end of the cargo hold skirt to a cargo hold of an automobile, thereby draping the cargo hold skirt from the attached end over an exterior surface of the automobile.

16. The method of claim 15 further comprising, prior to the attaching step, reversing the layers.

17. The method of claim 16 wherein the providing step is characterized by a cargo hold skirt having one or more exposable reflective surfaces.

18. The method of claim 17 wherein the providing step is characterized by a cargo hold skirt having one or more exposable emergency indicia.

19. The method of claim 15 further comprising placing an article through the disconnected edge and into a pocket formed by the layers.

20. An automobile accessory comprising:
a cargo hold skirt; and
means for selectively switching the cargo hold skirt from a protective covering device to an emergency messaging device.

* * * * *